United States Patent [19]

Eisenhauer

[11] 4,372,050
[45] Feb. 8, 1983

[54] PANEL MARKING CONSTRUCTION

[76] Inventor: Elroy C. Eisenhauer, 775 Tifft St., Buffalo, N.Y. 14220

[21] Appl. No.: 914,441

[22] Filed: Jun. 12, 1978

[51] Int. Cl.³ ............................................. G01B 3/14
[52] U.S. Cl. ................................ 33/174 G; 33/180 R; 33/DIG. 10
[58] Field of Search ......... 33/174 G, DIG. 10, 180 R

[56] References Cited
U.S. PATENT DOCUMENTS 2,775,812  1/1957  Mohr ............................ 33/DIG. 10
3,526,947  9/1970  Pasek ............................... 33/174 G Primary Examiner—Willis Little Attorney, Agent, or Firm—Joseph P. Gastel

[57] ABSTRACT

A templet construction for marking a portion to be cut out of a panel consisting of a sheet of flexible planar material having a central portion of a predetermined shape, tabs formed integrally with the central portion, pressure-sensitive adhesive on the central portion and the tabs, backing material on the pressure-sensitive material, V-shaped cutouts for providing a line of demarcation between the central portion and the tabs to facilitate bending back of the tabs relative to the central portion, and cuts in the backing material at the lines of demarcation to permit the backing material to be removed from the tabs prior to removing the backing material from the central portion.

5 Claims, 12 Drawing Figures

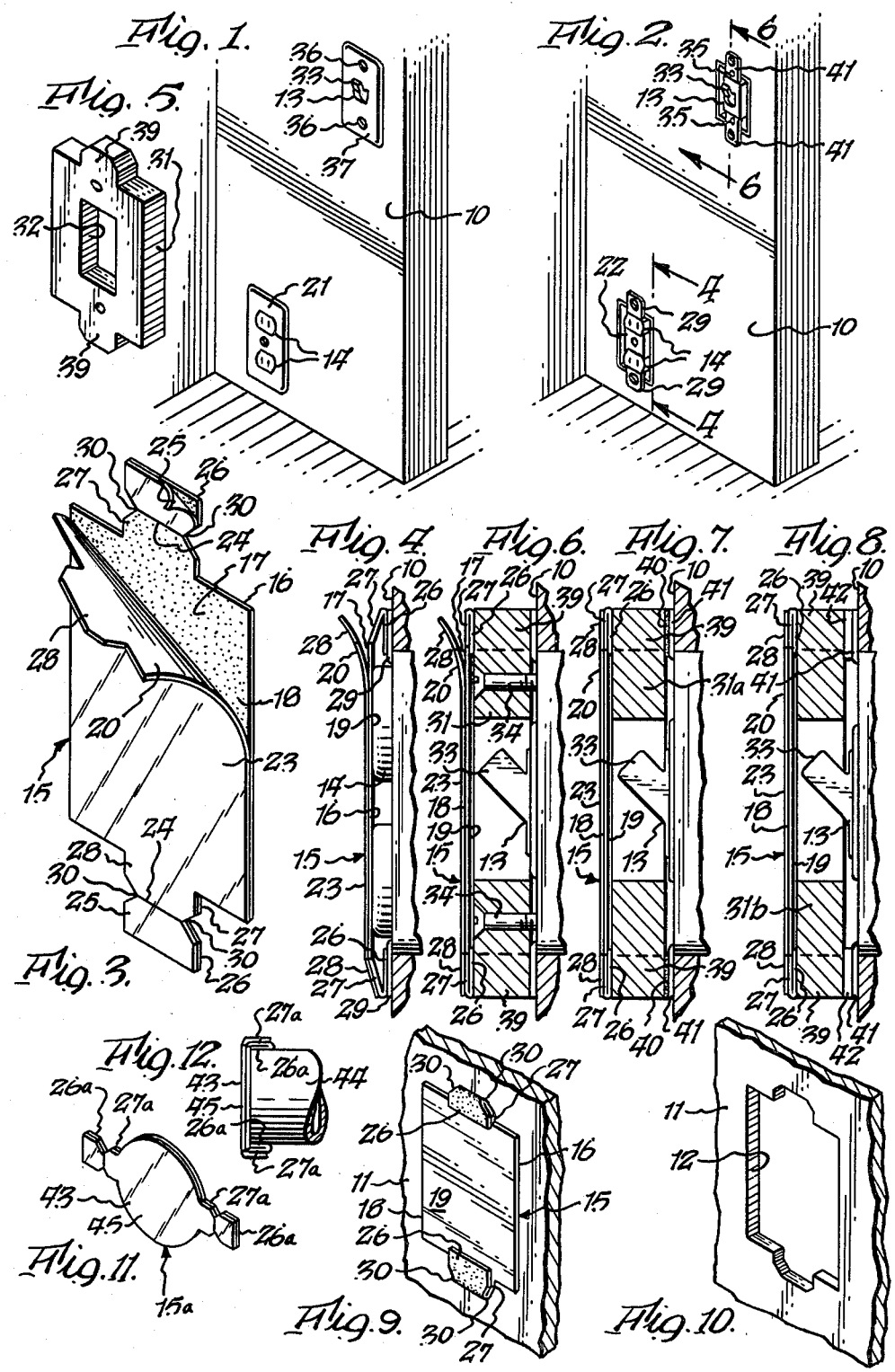

PANEL MARKING CONSTRUCTION

BACKGROUND OF THE INVENTION

The present invention relates to a templet for marking a portion to be cut out of paneling or the like which is to be mounted on a subsurface such as a wall.

When mounting paneling on a wall, it is often necessary to cut holes in the paneling to provide access to objects such as light switches, ducts, pipes, and the like. In the past, various types of marking devices were mounted on a wall and transferred an impression to the rear of paneling pressed against them. Such prior devices included inked templets such as shown in U.S. Pat. Nos. 3,745,664 and 3,913,235. In addition, there were other types, such as shown in U.S. Pat. Nos. 2,775,812 and 2,898,688 which included sharp prongs which made indentations in the rear of paneling pressed against them after they were mounted in a predetermined location on a subsurface. However, all of the foregoing types of paneling marking constructions were complicated, expensive and also, in the case of the inked marking type, required inking materials.

SUMMARY OF THE INVENTION

It is accordingly the object of the present invention to provide an improved panel marking construction which is inexpensive, simple to use, and which is highly effective in that it marks the precise area with the shape which is to be cut out of paneling.

It is another object of the present invention to provide an improved panel marking construction which can be tailored to a precise shape easily and simply to thereby provide the exact shape of the portion which is to be cut out of a panel, as well as to locate it positively.

It is a further object of the present invention to provide an improved panel marking construction which will not mar the surface of the paneling in the event the paneling is not placed in the proper position against the subsurface and also will not mark it with paint or the like in areas which are not to be cut out. Other objects and attendant advantages of the present invention will readily be perceived hereafter.

The present invention relates to a templet construction for marking a portion on the rear of a member to be mounted on a substructure comprising a central portion of a predetermined shape, an area of pressure-sensitive adhesive on said templet, attachment means for attaching said templet to said substructure with said area of pressure-sensitive adhesive facing away from said substructure so that said area will adhere to said rear of said panel when said panel is pressed against said substructure.

The various aspects of the present invention will be more fully understood when the following portions of the specification are read in conjunction with the accompanying drawings wherein:

BRIEF DESCRIPTION OF THE DRAWINGS

FIG. 1 is a fragmentary perspective view of a wall having an electrical switch structure and an electrical plug structure mounted thereon;

FIG. 2 is a view similar to FIG. 1 but showing the cover plates removed from the plug and the switch;

FIG. 3 is a perspective view of the panel marking templet of the present invention showing the backing paper which is normally on the pressure sensitive adhesive partially peeled away;

FIG. 4 is a fragmentary side elevational view, partially in cross section, taken in the direction of line 4—4 of FIG. 2 and showing the templet mounted on the electrical plug;

FIG. 5 is a perspective view of a block which can be used to position the templet of FIG. 3 relative to an electrical switch;

FIG. 6 is a fragmentary cross-sectional view taken substantially in the direction of arrows 6—6 of FIG. 2 with the block of FIG. 5 mounted thereon;

FIG. 7 is a view similar to FIG. 6 but showing an alternate type of block construction;

FIG. 8 is a view similar to FIG. 7 but showing a still further type of block construction;

FIG. 9 is a fragmentary perspective view showing how the templet of the present invention adheres to a panel which has been placed in its final position on a substructure and thereafter removed;

FIG. 10 is a fragmentary perspective view of the panel of FIG. 9 with a cutout portion where the templet previously was located;

FIG. 11 is a perspective view of a templet in the form of a circle which can be used to mark the location of a pipe or the like on the rear of a panel; and FIG. 12 is a side elevational view showing how the templet of FIG. 11 is mounted on the end of a pipe.

DESCRIPTION OF THE PREFERRED EMBODIMENTS

In FIG. 1 a wall substructure 10 is shown which is to be covered with paneling material 11, such as wood paneling. However, prior to mounting panel 11 on wall 10, a hole, such as 12, must be cut out of panel 11 to provide accessibility to the light switch 13 and to the electrical outlet 14. In order to insure that the hole, such as 12, will be located in the proper position, the improved templet 15 of the present invention is utilized. This templet is actually a shaped sheet 16 of paper having a pressure-sensitive adhesive surface 17 which extends throughout one face of templet 15. The opposite surface 19 does not contain adhesive thereon. A protective backing paper 20 is located on the adhesive surface 17 and this backing is stripped therefrom during use, as will appear hereafter. The templet 15 comprises a single sheet of paper including a central portion 18 with ears 27 at opposite sides from which tabs 26 extend.

In order to specifically locate the portion 12 which is to be cut out of panel 11, the cover plate 21 of plug 14 is removed, thereby exposing the entire plug structure 22. At this point it is to be noted that the backing paper 20 includes a central portion 23 which covers templet portion 18 and ear covering portions 28 which cover ears 27. Portions 28 terminate at cut lines 24, which separate backing paper portions 25 from backing paper portions 28. Backing paper continuation portions 25 cover tabs 26 which in turn are continuations of ears 27.

In use, after cover plate 21 has been removed, the backing paper portions 25 are peeled from tabs 26. This is possible because the cuts 24 separate portions 28 from portions 25. Thereafter, tabs 26 are folded backwardly to assume the positions shown in FIG. 4 whereupon the pressure-sensitive surfaces on tabs 26 can be caused to adhere to portions 29 of plug 22. The bending backwardly of tab portions 26 is effected very simply because of the fact that the facing V-shaped notches 30 are located between tabs 26 and ears 27. In this respect, the notches 30 form a locating index or demarcation between tabs 26 and ears 27.

After the templet 15 has been mounted as shown in FIG. 4, the backing paper central portion 23 is removed from the central portion 18 and ears 27 of the templet by peeling the backing paper portions 23 and 28 therefrom. Thereafter, the panel 11 is placed in its final position relative to substructure 10 and pressed against the adhesive surface 17 on central portion 18. Because this adhesive surface is of larger area than the combined adhesive surface on tab portions 26, the templet 15 will adhere to the surface of panel 11 more tenaciously than tabs 26 will adhere to plug portions 29 so that when the panel 11 is drawn away from substructure or wall surface 10, the templet 15 will pull away with it, as shown in FIG. 9. Thereafter, all that is necessary to provide a cutout 12 of the proper size and location in panel 11 is to merely cut out the panel around the outline of templet 15.

Templet 15, as described above, can also be used to mark the location of an item, such as switch 13, which is shown with the cover plate removed in FIG. 2. However, since switch 13 projects a considerable amount from wall surface 10, a block 31 (FIG. 5) is used in conjunction with templet 15. Block 31 has a face which is substantially the same shape of templet 15 minus tab portions 26. A hole 32 is formed in block 31 to receive the toggle 33 of switch 13.

In FIG. 6, block 31 is shown mounted on switch 13 by means of screws 34 which are received in tapped openings 35 which normally receive screws 36 which attach cover plate 37 to the remainder of the switch. After block 31 has been mounted as shown in FIG. 6, the backing paper 25 is stripped from tab portions 26, which are then bent rearwardly so as to adhere to ear portions 39 of block 31. Thereafter, backing paper 23 is removed from the central portion 20 and tab portions 27 so that when panel 11 is pressed against the templet, the adhesive surface 17 on central portion 18 and ears 27 will adhere to the panel. When the panel is pulled away from the wall, the templet will come away with it, as described above relative to FIG. 9.

In FIG. 7 a modified block construction 31a is shown. This block includes pressure-sensitive adhesive 40 on the rear of ear portions 39 so that screws 34 need not be used. Block 31a otherwise can be identical in all respects to block 31. To install block 31a, all that is necessary is to remove suitable backing paper from pressure-sensitive adhesive 40, and press the block against switch 13 so that portions 40 adhere to portions 41 of the switch. Thereafter, templet 15 is mounted on block 31a in the same manner as described above relative to FIG. 6, and when the panel is pressed against the pressure-sensitive surface 17 of templet 15, it will adhere to the panel. It may be that the block 31a may pull away from the switch if the bond at 40 is weaker than the bond at 26. However, in this event the block 31a may be pulled away from the panel afterwards.

In FIG. 8 a further modified block construction 31b is shown. This block is identical in all respects to block 31 except that it has magnets 42 mounted on the rear thereof for attraction to magnetic metal tabs 41 of switch 13. The templet 15 is mounted on block 31b in the same manner as described above relative to FIGS. 6 and 7 and templet 15 locates the portion to be cut out in the same manner.

In FIG. 11 a modified templet 15a is shown. This templet differs from those described above in that it discloses a circular portion 43 rather than a rectangular portion, such as shown in FIG. 3. Templet 12 is for the purpose of locating a cutout for the end of a circular pipe, such as 44. In use, tab portions 26a are stripped of their backing paper and portion 26a is bent over onto portions 27a as shown in FIG. 12. Thereafter, the templet is caused to adhere to the outside of the pipe 44. The backing paper 45 is then removed from central portion 43 and when a panel, such as 11, is pressed against the pressure-sensitive adhesive on templet 43, it will adhere thereto and be pulled away with the panel after the panel is removed, thus providing the exact shape and size of the portion to be cut out from the panel.

It will be appreciated that because the templets of the present invention are fabricated from paper, they can be tailored, by cutting, to form any desired shape.

While preferred embodiments of the present invention have been discussed, it will be appreciated that the present invention is not limited thereto but may be otherwise embodied within the scope of the following claims.

What is claimed is:

1. A templet construction for marking a portion on the rear of a member to be mounted on a substructure comprising a templet of a predetermined shape fabricated from flexible sheet-like material, a first area of pressure-sensitive adhesive on said templet, a second area of pressure-sensitive adhesive of lesser size than said first area for attaching said templet to said substructure with said first area facing away from said substructure so that said first area will adhere to said rear of said member when said member is pressed against said first area facing away from said substructure, said second area being a continuation of said first area on the same side of said sheet-like material as said first area, said templet being bendable between said first and second areas to cause said first and second areas to face in opposite directions whereby said second area can be pressed against said substructure with said first area facing away from said substructure toward said member, and locating means for providing a demarcation between said first and second areas to thereby facilitate the bending back of said second area relative to said first area, said locating means comprising V-shaped cutouts facing each other.

2. A templet construction for marking a portion on the rear of a member to be mounted on a substructure comprising a templet of a predetermined shape fabricated from flexible sheet-like material, a first area of pressure-sensitive adhesive on said templet, a second area of pressure-sensitive adhesive of lesser size than said first area for attaching said templet to said substructure with said first area facing away from said substructure so that said first area will adhere to said rear of said member when said member is pressed against said first area facing away from said substructure, said second area being a continuation of said first area on the same side of said sheet-like material as said first area, said templet being bendable between said first and second areas to cause said first and second areas to face in opposite directions whereby said second area can be pressed against said substructure with said first area facing away from said substructure toward said member, locating means for providing a demarcation between said first and second areas to thereby facilitate the bending back of said second area relative to said first area, a block, means for mounting said block on said substructure, and means on said block for attachment to said second area.

3. A templet construction for marking the rear of a member to be mounted on a substructure comprising a sheet of flexible planar material, a central portion of a predetermined shape on said planar material, tab means formed integrally with said central portion for being bent rearwardly relative to said central portion for attachment to said substructure, said tab means being of a smaller area than said central portion, pressure-sensitive adhesive on the same side of said central portion and said tab means, backing material on said pressure-sensitive material, and location means for providing a demarcation between said central portion and said tab means for locating the area at which said tab means are to be bent rearwardly relative to said central portion, said location means comprising V-shaped cutouts.

4. A templet construction as set forth in claim 3 wherein there are two V-shaped cutouts facing each other at the demarcation between said central portion and each of said tab means.

5. A templet construction as set forth in claim 3 including a cut separating said backing material at said demarcation to permit said backing material to be removed from said tab means without removing said backing material from said central portion.

* * * * *